US008607073B2

(12) United States Patent
Grobbel et al.

(10) Patent No.: US 8,607,073 B2
(45) Date of Patent: Dec. 10, 2013

(54) STORAGE MEDIUM HAVING AN ENCRYPTING DEVICE

(75) Inventors: Hubertus Grobbel, Munich (DE); Fabian Guter, Feldkirchen (DE); Marcus Rosin, Starnberg (DE)

(73) Assignee: Giesecke & Devrient GmbH, Munich (DE)

( * ) Notice: Subject to any disclaimer, the term of this patent is extended or adjusted under 35 U.S.C. 154(b) by 0 days.

(21) Appl. No.: 13/266,256

(22) PCT Filed: Apr. 26, 2010

(86) PCT No.: PCT/EP2010/055518
§ 371 (c)(1),
(2), (4) Date: Dec. 30, 2011

(87) PCT Pub. No.: WO2010/125021
PCT Pub. Date: Nov. 4, 2010

(65) Prior Publication Data
US 2012/0102337 A1   Apr. 26, 2012

(30) Foreign Application Priority Data

Apr. 28, 2009   (DE) .......................... 10 2009 019 051

(51) Int. Cl.
*G06F 21/00* (2013.01)
(52) U.S. Cl.
USPC ................................ 713/193; 726/28; 726/29
(58) Field of Classification Search
USPC .......................................................... 713/193
See application file for complete search history.

(56) References Cited

U.S. PATENT DOCUMENTS

| 6,079,019 A | 6/2000 | Fukuzumi |
| 6,158,004 A | 12/2000 | Mason et al. |
| 6,513,719 B1 | 2/2003 | Imura |
| 7,069,447 B1 | 6/2006 | Corder |

(Continued)

FOREIGN PATENT DOCUMENTS

| DE | 19803218 | 12/1998 |
| DE | 102006048029 | 4/2008 |

(Continued)

OTHER PUBLICATIONS

International Search Report in PCT/EP2010/055518, Jul. 8, 2010.

(Continued)

*Primary Examiner* — Justin T Darrow
(74) *Attorney, Agent, or Firm* — Workman Nydegger

(57) ABSTRACT

A storage medium having an encrypting device, including an electronic memory area, a read-in device, a read-out device, a key memory, in which a secret key is or can be stored, an encrypting device, and a decrypting device. The read-in device is designed to encrypt any data input at the interface for storage in the memory area using the key stored in the key memory and to store said encrypted data in the memory area. The read-out device has a direct read-out channel, by means of which stored encrypted data can be output to the interface in encrypted form by circumventing the decrypting device, and a decrypting read-out channel, by means of which stored encrypted data in the memory area can be decrypted by means of the decrypting device using the key stored in the key memory or a decryption key stored in the key memory and corresponding to the key and can be output to the interface in decrypted form.

3 Claims, 1 Drawing Sheet

(56) References Cited

U.S. PATENT DOCUMENTS

| | | |
|---|---|---|
| 7,397,919 B2 | 7/2008 | Anzai |
| 2003/0085289 A1 | 5/2003 | Kaneko |
| 2005/0018472 A1 | 1/2005 | Lim |
| 2007/0113097 A1 | 5/2007 | Wang |
| 2007/0168292 A1 | 7/2007 | Jogand-Coulomb et al. |
| 2008/0071977 A1 | 3/2008 | Chow et al. |
| 2010/0004813 A1 | 1/2010 | Lindinger et al. |
| 2010/0208042 A1* | 8/2010 | Ikeda et al. .................... 348/53 |

FOREIGN PATENT DOCUMENTS

| | | |
|---|---|---|
| EP | 1074906 | 2/2001 |
| GB | 2405007 | 10/2004 |
| WO | 03012657 | 2/2003 |

OTHER PUBLICATIONS

Search Report of German PTO regarding DE 10200901905A1, Nov. 11, 2010.

Written Opinion of ISR in PCT/EP2010/055518, Jul. 8, 2010 (English Translation).

IPRP in PCT/EP2010/055518, Nov. 15, 2011.

* cited by examiner

STORAGE MEDIUM HAVING AN ENCRYPTING DEVICE

BACKGROUND OF THE INVENTION

1. Field of the Invention

The invention relates to a storage medium having an encrypting device according to the preamble of claim 1.

2. Related Art

An example of a known storage medium in the sense of the invention is a flash memory card having an encryption option, having a cryptoprocessor used as an encrypting and a decrypting device, and a symmetrical encryption and decryption key stored in the card for encrypting data. In such a flash memory card a user at a card terminal, e.g. a PC with a flash card reader connected to it or a mobile card terminal such as a mobile telephone with a flash card reader, can optionally select via a menu of the card terminal whether data to be stored in the flash memory card are to be stored in the flash memory card in encrypted form. Unencrypted stored data can be read out of the flash memory card. Encrypted stored data can only be read out of the flash memory card after successful authentication of the user with respect to the flash memory card. If an attempt is made to read out encrypted stored data without authentication, the read-out process is terminated without output of data and possibly with an error message or authentication request being output.

In some applications a holder of a storage medium, who has been requested by an owner of the storage medium to store data on the storage medium, is regarded as potentially untrustworthy by the owner. For example, a monitoring service which stores captured photo or video recordings in a storage medium for monitoring purposes, should have no possibility for reading out the stored photo or video recordings again and misusing them, e.g. to publish them among their associates or on the internet for private purposes. Even if the storage medium has an encryption option, it is possible that the untrustworthy holder simply does not use the same and can therefore read out the stored data arbitrarily after they are stored.

DE 198 03 218 A1 describes a memory card with the features of the preamble of claim 1. Data are either encrypted when being read into the card and decrypted when read out, or read in and out in unencrypted form. US 2008/0071977 A1 shows a card having a fingerprint sensor, which is used to allow access to stored data only to authenticated users.

SUMMARY OF THE DISCLOSURE

The object of the invention is to create a storage medium with an encryption option which enables secure storage of data even in an untrustworthy environment.

The storage medium is equipped with an electronic memory area, an interface for reading in data into the storage medium and for reading out data from the storage medium, a read-in device coupled between the interface and the memory area for storing data from the interface into the memory area, a read-out device coupled between the interface and the memory area for outputting data from the memory area to the interface, a key memory in which a secret key is or can be stored, an encrypting device coupled to the read-in device for encrypting data input into the storage medium at the interface with the key, and a decrypting device coupled to the read-out device for decrypting data output from the memory area with the key.

The storage medium is characterized in that the read-in device is designed to encrypt any data that are input at the interface for storage in the memory area with the key stored in the key memory and to store them in encrypted form in the memory area, and that the read-out device has two different read-out channels. More precisely there is a first, direct read-out channel, which is designed to allow, when data are output via the direct read-out channel, stored encrypted data in the memory area to be output to the interface in encrypted form by circumventing the decrypting device. There is additionally a second, decrypting read-out channel, which is designed to allow, when data are read out via the decrypting read-out channel, stored encrypted data in the memory area to be decrypted by means of the decrypting device using the key stored in the key memory or a decryption key stored in the key memory and corresponding to the key, and to be output to the interface in decrypted form.

In the storage medium therefore, any data input at the interface are encrypted without the possibility of interference by a user of the storage medium. This enables untrustworthy persons to be entrusted with the recording and storage of data.

In addition, encrypted stored data can be output optionally in encrypted or decrypted form. For example, an employee of a monitoring service who has recorded data with the storage medium, can read out the encrypted data from the storage medium in encrypted form and transmit them in encrypted form to a trustworthy control centre. This procedure can be used e.g. in cases when the employee of the monitoring service retains the storage medium and only transmits the data to the control centre. In cases when the control centre does not only receive the data but the whole storage medium itself, a trustworthy employee of the control centre can decrypt the data during the read-out process and thereby output them from the storage medium in decrypted form.

Optionally the storage medium further has an authentication device being coupled to the read-out device and being designed such that the data can be output to the interface via the decrypting read-out channel in decrypted form only upon successful authentication. This ensures that only trustworthy users—characterized by their ability to successfully authenticate themselves with respect to the storage medium—can obtain the stored data in plain text, i.e. in either decrypted form or non-encrypted form.

Optionally, the authentication device is further designed such that in the event of unsuccessful authentication the data are output via the direct read-out channel in the encrypted form, i.e. as stored in the memory, i.e. as they are read out without authentication.

Optionally, the memory area is additionally configured at least partially as a flash memory. The storage medium is optionally a flash memory card which is intelligently designed, i.e. it has a Smart Card microprocessor and/or cryptoprocessor or the like.

Optionally, a symmetric key of a symmetric encryption system is provided as a key. In this case, the same key is used for encryption and decryption. It is also possible in principle that two different matching keys are used for encryption and decryption, which are optionally both stored in the storage medium, e.g. in the key memory.

The encryption device and the decrypting device can optionally be configured as two separate devices or as one single combined encrypting and decrypting device, and can be optionally in the form of one or two cryptoprocessor(s) or Smart Card microprocessor(s) respectively.

BRIEF DESCRIPTION OF THE DRAWINGS

In the following the invention is explained in further detail based on exemplary embodiments and by reference to the drawing, wherein shown are in.

DETAILED DESCRIPTION OF PREFERRED EMBODIMENTS OF THE INVENTION

Figure 1:
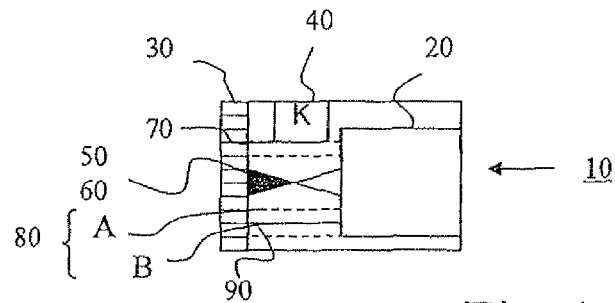
FIG. 1 a storage medium according to an embodiment of the invention.

FIG. 1 shows a storage medium 10 according to an embodiment of the invention, having an electronic memory area 20, an interface 30 for reading in data into the storage medium (into the memory area 20) and for reading out data from the storage medium (out of the memory area 20), a read-in device 70 coupled between the interface 30 and the memory area 20 for storing data from the interface 30 into the memory area 20, a read-out device 80 coupled between the interface 30 and the memory area 20 for outputting data from the memory area 20 to the interface 30, an authentication device 90 coupled to the read-out device 80, a key memory 40 in which a secret key K is stored, an encryption device 50 coupled to the read-in device 70 for encrypting data input at the interface 30 into the storage medium 10 with the key K, and a decrypting device 60 coupled to the read-out device 80 for decrypting data output from the memory area 20 with the key K. The read-in device 70 and the encryption device 50 have no user interface and therefore allow a user no choice as to whether input data are encrypted or not. The encryption device 50 always carries out an encryption on data received at the interface 30. The read-out device 80 has a first, direct read-out channel A and a second, decrypting read-out channel B. The authentication device 90 is integrated into the second, decrypting read-out channel B.

A read/write device (not shown) for storage media 10 can be coupled to the interface 30 of the storage medium 10, so that data can be transferred from the read/write device to the storage medium 10 and from the storage medium 10 to the read/write device.

Figure 2:
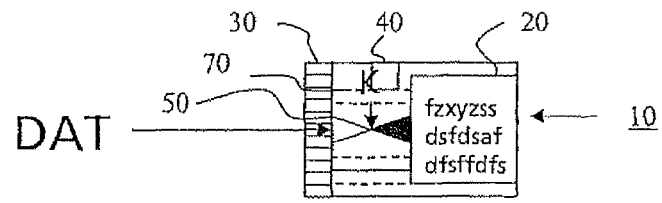
FIG. 2 reading in of data into the storage medium of FIG. 1.

FIG. 2 shows, on the storage medium 10 of FIG. 1, reading in of data DAT into a storage medium 10. Some of the reference labels are omitted in FIG. 2-4 for the sake of clarity. Data DAT are provided to the storage medium 10 at the interface 30. The read-in device 70 supplies the data DAT present at the interface 30 to the encryption device 50, which encrypts the data DAT and stores them in the memory area 20 as encrypted data FZXYZSS.

Figure 3:
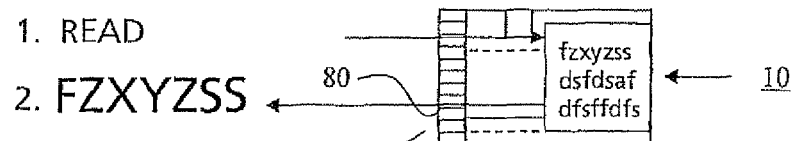
FIG. 3 reading out of data from the storage medium of FIG. 1 via a first, direct read-out channel A.

FIG. 3 shows reading out of data from the storage medium 10 of FIG. 1 via a first, direct read-out channel A of the read-out device 80. Via the interface 30 a read command READ is input into the storage medium 10. The read-out device 80 processes the read command READ and delivers the encrypted data FZXYZSS to be read out, e.g. the entire memory contents of the memory area 20 or, in some cases the memory contents of a selectable partial memory area of the memory area 20, in encrypted form, i.e. as stored in the memory area, to the interface 30. At the interface 30 therefore, encrypted data FZXYZSS are present to be received by a read/write device.

Figure 4:
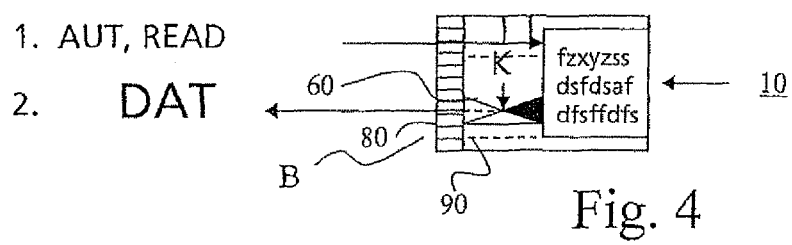
FIG. 4 reading out of data from the storage medium of FIG. 1 via a second, decrypting read-out channel B.
Figure 5:
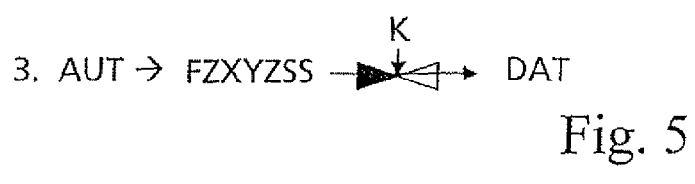
FIG. 5 a subsequent decryption of encrypted data read out according to FIG. 3.

FIG. 4 shows reading out of from the storage medium 10 of FIG. 1 via a second, decrypting read-out channel B of the read-out device 80. Via the interface 30 an authentication command AUT and a read command READ are input into the storage medium 10. The read-out device 80 first processes the authentication command AUT and sends it to the authentication device 90 for execution. The authentication device 90 executes the authentication command AUT. If the authentication thereby executed with the authentication command AUT is successful, the read command READ is then processed by the read-out device 80. Encrypted data FZXYZSS to be read out, e.g. the whole memory contents of the memory area 20 or, in some cases the memory contents of a selectable partial memory area of the memory area 20, are transmitted to the decrypting device 60 and are decrypted by the decrypting device 60 into decrypted data DAT. The decrypted data DAT are presented at the interface 30 so that they can be received by a read/write device.

In the embodiment of the data read-out of FIG. 4 the authentication command AUT and the read command READ are input to the interface 30 in a single transmission process. In this process, the user is for example requested to authenticate himself and his authentication is implicitly interpreted as a request for data to be read out. Alternatively, an authentication command AUT is input into the interface 30 and interpreted by the read-out device 80 and the authentication device 90. In the event of a successful authentication, the storage medium 10 outputs an authentication confirmation at the interface 30 and the input of a read command into the interface 30 is requested. Upon input of the read command READ into the interface 30 the data are decrypted as described above and provided in decrypted form DAT at the interface 30, for being received by a read/write device.

In the event of an unsuccessful authentication, optionally either encrypted data are output, essentially as in the case of a read-out without authentication, or alternatively no data are output at all.

The invention claimed is:

1. A storage medium having an encryption device, comprising
an electronic memory area,
an interface arranged to read in data into the storage medium and to read out data from the storage medium,
a read-in device coupled between the interface and the memory area to store data from the interface into the memory area,
a read-out device coupled between the interface and the memory area to output data from the memory area to the interface,
a key memory, in which a secret key is or can be stored,
an encryption device coupled to the read-in device, to encrypt data input into the storage medium at the interface, using the key, and
a decryption device coupled to the read-out device, to decrypt data output from the memory area,
the read-in device being arranged to encrypt, using the key stored in the key memory, any data that are input at the interface for storage in the memory area, and to store them in encrypted form in the memory area, and wherein
the read-out device comprises:
a direct read-out channel, arranged so that data being stored in the memory area in an encrypted form and being output to the interface via the direct read-out channel are output in said encrypted form, thereby circumventing the decrypting device, and
a decrypting read-out channel, which is arranged so that data being stored in the memory area in an encrypted form and being output to the interface via the decrypting read-out channel, are decrypted by means of the decrypting device using the key (K) stored in the key memory or a decryption key stored in the key memory and corresponding to the key, and are output in decrypted form, and the storage medium further comprising an authentication device, which is coupled to the read-out device, wherein the authentication device is arranged so that the data are output in decrypted form via the decrypting read-out channel to the interface uppermost in the event of a successful authentication, and in the event of missing or unsuccessful authentication the data are output in the encrypted form via the direct read-out channel.

2. The storage medium according to claim 1, wherein the memory area is configured at least partially as a flash memory.

3. The storage medium according to claim 1, wherein a symmetric key of a symmetric encryption system is provided as a key.

\* \* \* \* \*